(12) United States Patent
Lenterman (10) Patent No.: US 9,643,476 B2
(45) Date of Patent: May 9, 2017

(54) DURABLE FOLDING AUTOMOBILE SUNSHADE AND METHOD OF MANUFACTURING SAME

(71) Applicant: Intro-Tech Automotive, Inc., Chino, CA (US)

(72) Inventor: Henri B. Lenterman, Chino Hills, CA (US)

(73) Assignee: Intro-Tech Automotive, Inc., Chino, CA (US)

(*) Notice: Subject to any disclaimer, the term of this patent is extended or adjusted under 35 U.S.C. 154(b) by 41 days.

(21) Appl. No.: 14/636,038

(22) Filed: Mar. 2, 2015

(65) Prior Publication Data

US 2016/0129766 A1    May 12, 2016

Related U.S. Application Data

(60) Provisional application No. 61/948,846, filed on Mar. 6, 2014.

(51) Int. Cl.
| | |
|---|---|
| *B60J 1/20* | (2006.01) |
| *B32B 37/20* | (2006.01) |
| *B32B 37/12* | (2006.01) |

(52) U.S. Cl.
CPC ......... *B60J 1/2091* (2013.01); *B32B 37/1284* (2013.01); *B32B 37/20* (2013.01); *B32B 2305/022* (2013.01); *B32B 2305/34* (2013.01); *B32B 2307/416* (2013.01); *B32B 2307/51* (2013.01); *B32B 2571/00* (2013.01); *B32B 2605/00* (2013.01)

(58) Field of Classification Search
CPC .......... B60J 3/02; B60J 1/2077; B60J 1/2091; B60J 5/045; A47G 5/00
USPC ...... 160/379, 370.23, 84.06, 84.04; 296/97.7, 296/97.8
See application file for complete search history.

(56) References Cited

U.S. PATENT DOCUMENTS

| | | | |
|---|---|---|---|
| 4,081,937 A | 4/1978 | Koch | |
| 4,202,396 A * | 5/1980 | Levy | ............. B60J 1/2091 160/107 |
| 4,262,955 A * | 4/1981 | Duda | ............. B60R 5/045 296/24.44 |
| 4,606,572 A | 8/1986 | Maguire | |
| 4,671,334 A * | 6/1987 | Yadegar | ............. B60J 1/2091 160/370.23 |
| 4,727,920 A | 3/1988 | Siegler | |

(Continued)

*Primary Examiner* — Katherine Mitchell
*Assistant Examiner* — Abe Massad
(74) *Attorney, Agent, or Firm* — Intellectual Property Law Offices of Joel Voelzke, APC (57) ABSTRACT

In order to manufacture an automobile folding sunshade, continuous strips of a roll material such as thin cardboard are supplied at the same time that discrete panels of reinforcing material that is too stiff to be rolled are supplied. The strips and the discrete panels are laminated between top and bottom sheets of preferably highly reflective material such as mylar coated bubble insulation. The resulting laminate material is then cut to the correct size and shape to fit into the windshield of an automobile. The sunshade has upwardly extending tabs at the top that include the reinforced panels. The tabs engage the sun visors of an automobile. The result is an economical yet highly durable folding automobile sunshade that is easily installed in, and removed from, a windshield of a car or truck.

19 Claims, 5 Drawing Sheets

(56) References Cited

U.S. PATENT DOCUMENTS

| | | | |
|---|---|---|---|
| 4,777,994 A | 10/1988 | Nederveld | |
| 4,801,170 A | 1/1989 | Moore | |
| 4,838,600 A | 6/1989 | Wischusen, III | |
| 4,861,090 A | 8/1989 | Gavrieli | |
| 4,877,074 A * | 10/1989 | Castellano | B60J 1/2091 160/370.23 |
| 4,883,304 A | 11/1989 | Elliot | |
| 4,886,104 A | 12/1989 | Eldridge, Jr. | |
| 4,923,239 A | 5/1990 | Wischusen, III et al. | |
| 4,923,244 A * | 5/1990 | Clenet | B60J 7/0038 160/37 |
| 4,932,711 A | 6/1990 | Goebel | |
| 5,238,284 A * | 8/1993 | Whitaker | B60R 5/045 296/37.16 |
| 5,267,599 A | 12/1993 | Kim | |
| 5,649,584 A | 7/1997 | Leubecker | |
| 5,692,554 A | 12/1997 | Huang | |
| 6,092,584 A * | 7/2000 | Humphries | B60J 1/2091 160/370.23 |
| 6,095,230 A | 8/2000 | Mitchell et al. | |
| 6,135,193 A | 10/2000 | Lloyd | |
| 6,192,966 B1 * | 2/2001 | Yang | B29C 37/0057 160/370.22 |
| 6,289,968 B1 * | 9/2001 | Karten | B60J 1/2091 160/370.21 |
| 6,357,461 B1 | 3/2002 | Chai et al. | |
| 7,188,886 B2 * | 3/2007 | Lee | B60J 1/2088 296/97.7 |
| 7,748,432 B2 * | 7/2010 | Huang | B60J 1/2091 160/370.21 |
| 2007/0107858 A1 | 5/2007 | Huang | |
| 2010/0108273 A1 | 5/2010 | Huang | |
| 2013/0032299 A1 * | 2/2013 | Bratcher | F02D 45/00 160/84.01 |

* cited by examiner

DURABLE FOLDING AUTOMOBILE SUNSHADE AND METHOD OF MANUFACTURING SAME

CROSS-REFERENCE TO RELATED APPLICATIONS

This application claims priority from U.S. provisional patent application No. 61/948,846 filed Mar. 6, 2014.

BACKGROUND OF THE INVENTION

1. Field of the Invention

This invention relates to the field of automobile sunshades. More particularly, this invention relates to the field a durable folding automobile sunshade and a method of manufacturing the same.

2. Description of Related Art

Sunshades for placing within the windshields and other windows of automobiles and thus protecting the interiors of those autos against solar heating and sun damage have become popular, particular in geographic regions such as the American southwest where the searing desert summer sun can quickly raise the interior temperature of a parked automobile to well over 120° F., and can prematurely age, fade, and otherwise damage the interior of an automobile. Folding sunshades made of cardboard, sometimes covered with a reflecting outer surface such as mylar and plastic bubble wrap, are popular. A number of more elaborate sunshades have also been proposed and/or sold.

SUMMARY OF THE INVENTION

One shortcoming of the prior art is that a number of the inexpensive folding sunshades currently sold do not hold up well to handling and exposure to the sun. Such sunshades can droop and sag after only a season or two due to repeated handling and the effects of the sun on the materials used. Sunshades that droop and sag look sloppy. They can even droop to the extent that they fail to stay put underneath the windshield of a car, thus defeating their purpose.

The present invention is of an economical folding automobile sunshade that is particular resistant to droop, sagging, and other wear caused by handling and exposure to the sun, and a method of manufacturing that sunshade. The sunshade disclosed herein lasts significantly longer than comparably constructed and priced prior art folding sunshades, thus providing both cost savings for the consumer as well as a product that is significantly more eco-friendly over its life cycle.

According to the manufacturing method of the invention, two flexible sheets which will constitute the top and bottom covers or surfaces of the sunshade are fed into a laminating section from respective continuous rolls of material. At the same time, a number of parallel strips of rollable material that is preferably thin and lightweight are fed into the laminating section from respective continuous rolls of material. The rollable material provides some stiffness to panels of the sunshade, but is flexible enough so that the material can be provided from continuous rolls, i.e., the material is rollable, and thus can be fed into the equipment continuously. The rollable material thus constitutes a relatively weakly stiffening material, and the strips of that material constitute weakly stiffening strips.

At the same time, one or more discrete panels of non-rollable stiffening material are fed into the manufacturing equipment in parallel with the rollable material. The discrete panels thus constitute relatively strongly stiffening material.

Preferably the sheets of flexible material that will form the top and bottom panels of the sunshade include a highly reflective material such as mylar, aluminized plastic, or other such thin layers of highly reflective material. In a preferred embodiment the mylar sheets include thermal insulation. Examples of such materials are referred to variously as bubble foil insulation or thermal bubble wrap. Such materials as well as other highly light-reflective materials are well known within the automobile sunshade industry.

In an exemplary embodiment, the rollable stiffening material is thin cardboard that is stocked on continuous rolls, and the discrete stiffener panels are foamboard panels. Such foamboard panels provide the stiffness and strength required for what will be reinforced panels of the sunshade; however, the foamboard is too stiff to be rolled onto rolls and thus cannot be fed into the equipment continuously from rolls.

In an exemplary embodiment, the cardboard strips are fed into the manufacturing equipment continuously from rolls in parallel with, and at the same time as, the discrete foamboard panels, with some of the cardboard strips disposed between the foamboard panels and some of the cardboard strips disposed on the outsides of the foamboard panels. At the same time, the two mylar sheets are fed into the equipment above and below the cardboard strips and the foamboard panels. Adhesive is sprayed onto one or both of the mylar sheets and/or onto the cardboard strips and the foamboard panels, and those materials are then laminated together.

The material is then cut from the continuous rolls to define a laminated automobile sunshade blank, which is then die-cut or otherwise cut to the desired size and shape to fit inside the windshield of an automobile. Edging can then be stitched around the periphery of the sunshade to finish that periphery, or the peripheral edges are otherwise finished. The spaces between the cardboard strips, and the spaces between the foamboard panels and their respectively adjacent cardboard strips, define the fold lines where the sunshade will fold.

In the exemplary embodiment the cardboard strips are thin enough so that the edging can be stitched or otherwise affixed over the ends of those strips, with the stitching penetrating those strips. In contrast, the foamboard panels are not thin enough for the edging to be easily stitched over their ends. Accordingly, the foamboard panels extend close to, but not all the way to, the top and bottom edges of the sunshade and the stitching therefore does not penetrate those foamboard panels. The edging around the periphery of the sunshade can thus be stitched over the entire periphery, and does not have to cover the ends of the relatively thick foamboard panels. Because the foamboard panels extend close to the edges, however, the foamboard panels provide reinforcing that extends nearly the entire top-to-bottom extent of the sunshade and thus provides sufficient reinforcing to allow the sunshade to withstand the effects of sun and handling over time yet still stand upright without unacceptably dropping or sagging.

Alternatively, the reinforced panels may be made of a stiff material such as spring steel. The spring steel may be adhered or otherwise affixed to a carrier substrate such as the same cardboard strips that provide the weak reinforcing to the weaker panels.

Also in an exemplary embodiment, the sunshade has upwardly extending tabs or ears that include the foamboard stiffening panels, and that constitute reinforced tabs. The reinforced tabs are sized and positioned so that when the sunshade is placed into the windshield of an automobile and the user folds down the pivoting driver-side and passenger-side sun visors, those visors hold the tabs of the sunshade in place. Because the tabs include the foamboard stiffener panels in the reinforced sunshade panels that extend from almost top to bottom in the sunshade, the sunshade is held in place by those reinforced panels even if the rest of the sunshade would not be strong enough and robust enough to hold the entire sunshade up by themselves. The sunshade is therefore more easily installed against the interior of the windshield, and more easily removed, than various prior art sunshades.

The result is an economically priced yet highly durable and effective sunshade that continues to look good and function well through several seasons of even severe sun exposure and handling.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION OF THE PREFERRED EMBODIMENTS

Figure 1:
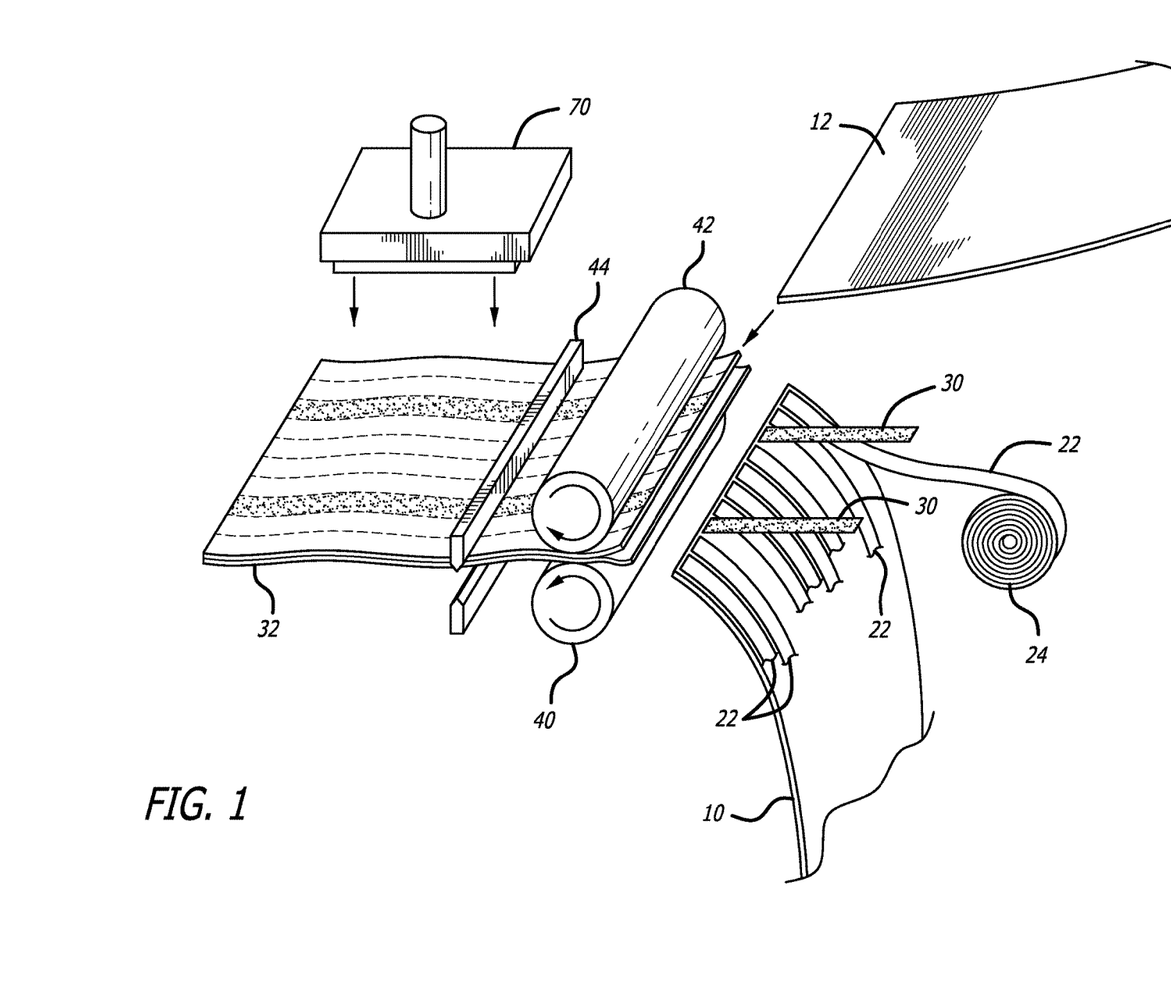
FIG. 1 is perspective drawing illustrating an overview of the automobile sunshade manufacturing process according to an illustrative embodiment of the present invention.

FIG. 1 is perspective drawing illustrating an overview of the automobile sunshade manufacturing process according to an illustrative embodiment of the present invention. Continuous sheets of flexible roll material 10, 12 that will form the top and bottom surfaces or covers of finished automobile sunshade 50 are fed into the laminating section of the equipment that is exemplified by rollers 40, 42 for illustration purposes. At the same time, continuous strips 22 of stiffening material such as non-corrugated cardboard or other fiber material capable of being rolled from continuous rolls 24 of such material are fed into the laminating section, and stiffener panels 30 of even stiffer reinforcing material such as foamboard panels are fed into the equipment in parallel with cardboard strips 22. There are spaces between adjacent cardboard strips 22, and between foamboard panels 30 and adjacent cardboard strips 22. Those spaces define where the fold lines of the finished sunshade 50 will be.

The reinforcing material is preferably at least three times, and can be at least five times, as stiff as the roll material.

The materials may be laminated together by spraying adhesive on at least either top panel 12 or bottom panel 10, or both, and possibly on the cardboard strips 22 and foamboard panels 30, then pressing those materials together such as by rollers 40, 42. Alternative methods of lamination are possible and well known.

In the illustrative embodiment, the laminated material is then cut by cutters 44 into individual laminated sunshade blanks 32. Those blanks can alternatively be, or can further be, cut by die 70 to the necessary size and shape to fit within the windshield area of various different makes and models of cars and trucks.

Figure 2:
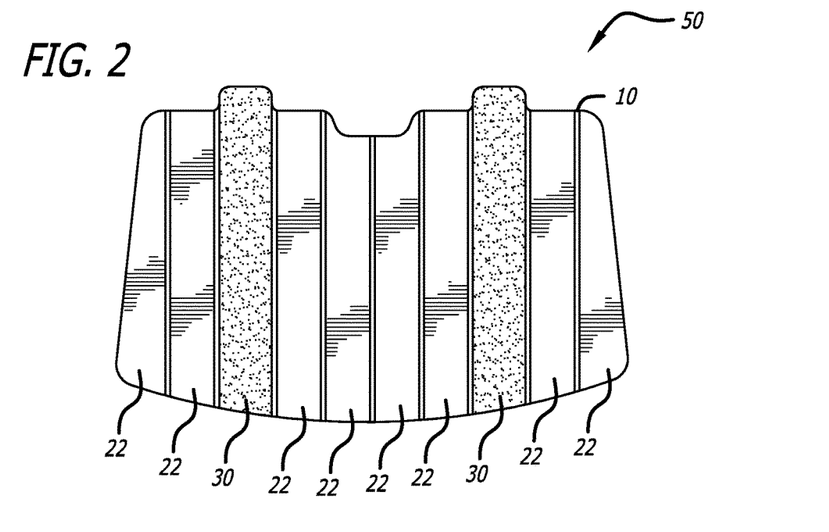
FIG. 2 is plan view of the automobile sunshade of an illustrative embodiment of the present invention but with the top cover 12 removed for clarity of illustration.

FIG. 2 is plan view of the automobile sunshade 50 according to an illustrative embodiment of the present invention but with the top cover 12 removed for clarity of illustration. Foamboard stiffener panels 30 extend generally in parallel with cardboard stiffener strips 22.

Figure 3:
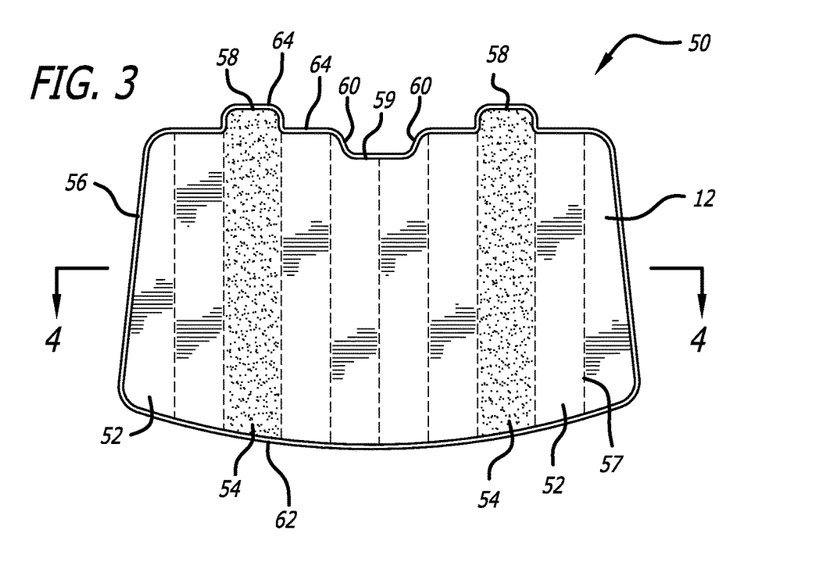
FIG. 3 is a plan view of the automobile sunshade of FIG. 2 including the top cover.

FIG. 3 is a plan view of the finished automobile sunshade 50 of FIG. 2 including the top cover 12. The completed automobile sunshade 50 includes panels 52 that are only weakly reinforced by cardboard strips 22, panels 54 that are strongly reinforced by foamboard panels 30, and edging 56 which finishes the edges of the sunshade around the periphery of the sunshade. The periphery of the sunshade includes top and bottom edges 62, 64 and the side edges of the sunshade. Panels 54 having foamboard panels 30 define reinforced panels or stronger panels, and panels 52 define weaker panels. In other words, first and second panels 54 are stiffer than panels 52, with panels 52 having a first stiffness and panels 54 having a second stiffness, the second stiffness being greater than the first stiffness. Preferably the reinforced panels 54 have at least one weaker panel 52 between them and at least one weaker panel 52 on either side of them. In the exemplary embodiment, each reinforced panel 54 has four weaker panels 52 between them, and each reinforce panel 54 has two weaker panels 52 disposed on their outsides, i.e., closer to the doors of the automobile. Edging 56 extends around and over the peripheral edges of the sunshade including bottom edge 62 and top edge 64.

The sunshade includes upwardly extending or projecting tabs or ears 58 which include reinforced panels 54. Foamboard panels 30 within reinforced panels 54 and ears 58 extend close to, but not all the way to, the top and bottom edges of sunshade 50. In an exemplary embodiment, foamboard panels 30 extend to less than three inches, preferably to within 1 to 1½ inches, but not all the way to, the top and bottom edges of sunshade 50. Foamboard stiffening panels 30 extend upwardly beyond the uppermost extent of at least some of the cardboard stiffening strips 22. The reinforced panels 54 containing the stiffening panels 30 are positioned within the sunshade 50 and are sized to engage respective driver side and passenger side pivoting sun visors in the automobile in which the sunshade is intended to be used.

Figure 7:
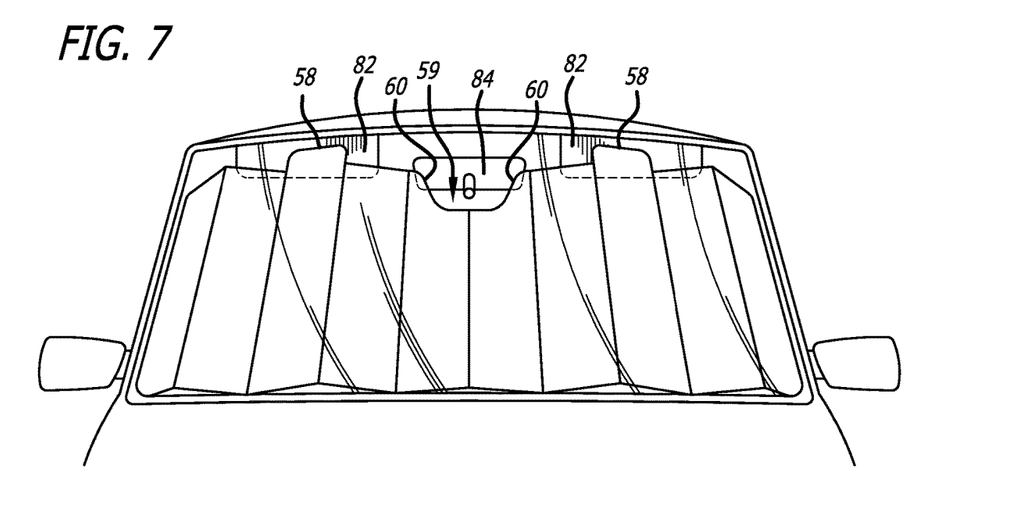
FIG. 7 is a perspective view showing the sunshade of FIG. 3 installed in the windshield of an automobile.

In one aspect, therefore, the embodiment of the folding sunshade 50 shown in FIGS. 3 and 7 and described herein includes: (a) a first panel 54 that extends upwardly to engage the passenger side sun visor when that sun visor is in its downward or deployed position; (b) a second panel 54 that extends upwardly to engage the driver side sun visor when that sun visor is in its downward or deployed position; (c) at least a third panel 52 laterally outward of the first panel; (d) at least a fourth panel 52 laterally outward of the second panel; and (e) at least a fifth panel between the first and second panels. The first and second panels are stiffer than the third, fourth, and fifth panels; are longer than the third, fourth, and fifth panels, and are stiff enough to hold up sunshade 50 when the sunshade is deployed underneath the windshield of an automobile. The weaker third, fourth, and fifth panels are made of rollable material for cost effectiveness, but the first and second panels are not made of rollable material. In the embodiment shown, the weaker panels between the stiffer first and second panels include a total of four weaker panels, namely, fifth, sixth, seventh, and eighth weaker panels between the two stiffer first and second panels that engage the sun visors.

The sunshade also has a cutout area 59 to accommodate the automobile's rear view mirror. The portions 60 of sunshade 50 that are immediately adjacent to rearview mirror cutout 59 are preferably highly bendable, and flexible and resilient enough such that when the user is installing the sunshade within the windshield of his car or truck, those portions bend sufficiently to allow the sunshade to be installed around the rear view mirror 84 (FIG. 7). This allows cutout 59 to be narrower from side to side and/or from top to bottom than is the rear view mirror 84, thus allowing the sunshade 50 to block more of the sun from coming in than if the cutout 59 were larger than the mirror. The thin cardboard strips 22 of the exemplary embodiment are flexible enough yet resilient enough to serve those functions. Alternatively, the cardboard strips 22 can stop short of the top edge 64 of the sunshade within the vicinity of the rear view mirror such that portions 60 adjacent the rear view mirror contain only, e.g., thermal bubble wrap material and no cardboard. In this way, portions 60 are made to be the most flexible portions of sunshade 50, allowing for even easier installation around the rear view mirror.

Figure 4:
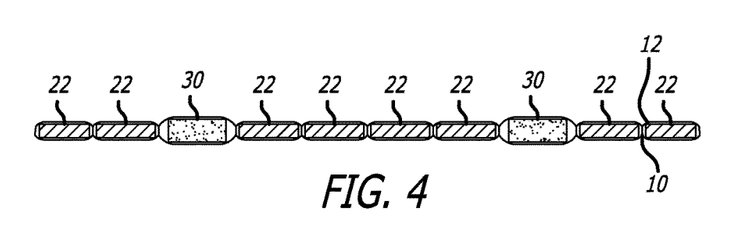
FIG. 4 is a sectional view of the automobile sunshade of FIG. 3 taken along section line 4-4'.

FIG. 4 is a sectional view of the automobile sunshade 50 of FIG. 3 taken along section line 4-4'.

Figure 5:
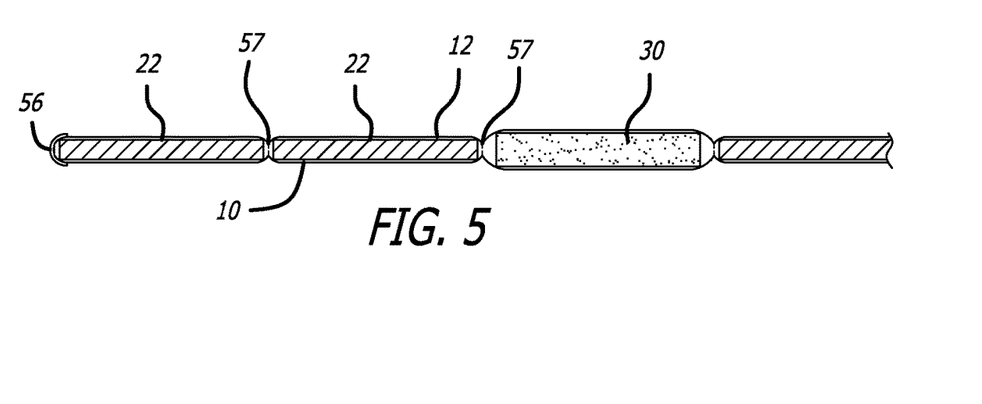
FIG. 5 is a closeup view of the left side of the sunshade section of FIG. 4.

FIG. 5 is a closeup view of the left side of the sunshade 50 section of FIG. 4. Sunshade 50 will fold along fold lines 57 between cardboard strips 22 and foamboard panels 30.

Figure 6:
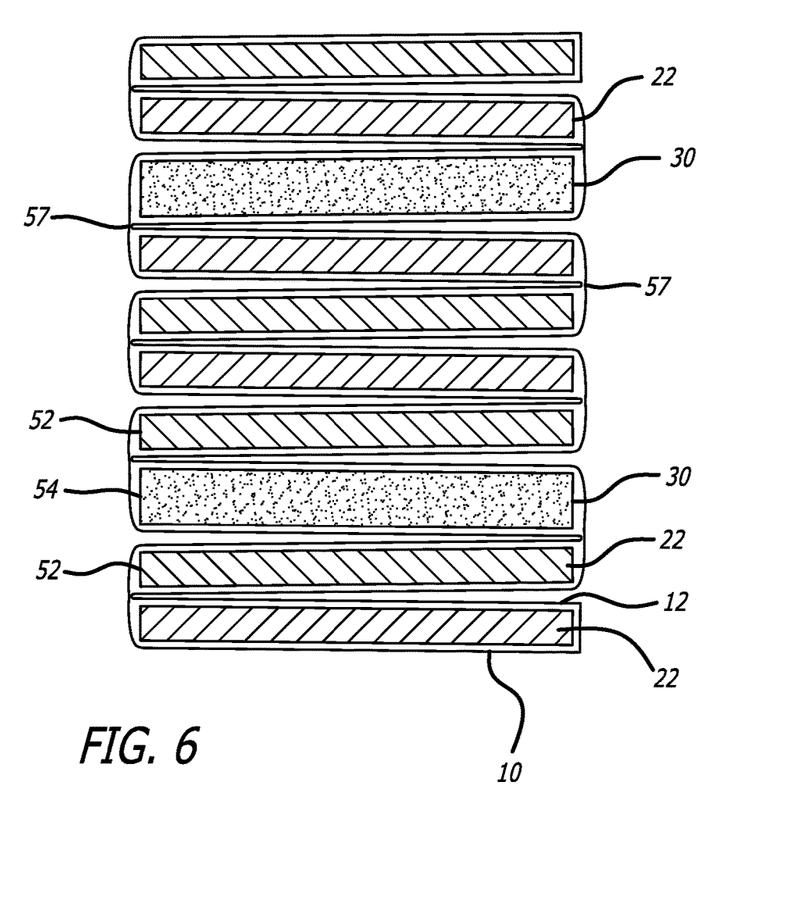
FIG. 6 is a sectional view of the automobile sunshade of FIG. 5 with the sunshade being nearly completely folded for storage.

FIG. 6 is a sectional view of the automobile sunshade of FIG. 5 with the sunshade nearly completely folded for storage. In its folded position, the various panels 52, 54 of the sunshade are held together in a stacked relation by the flexible and foldable material, namely insulating mylar sheets 10 and 12 in the embodiment, which extends between and over both the standard or weakly reinforced panels 52 and the strongly reinforced panels 54. The mylar sheets 10, 12 thus act as hinges allowing the sunshade to be folded along fold lines 57.

FIG. 7 is a perspective view showing the sunshade 50 of FIG. 3 installed in the windshield of an automobile. The user starts with the automobile's sun visors 82 in their unused or "up" positions, and places sunshade 50 behind (underneath) the windshield of the automobile. The user can either slide the sunshade up underneath the rear view mirror 84 from below, or can temporary bend the flexible portions 60 away so as to fit the sunshade around the mirror. The user then folds down the visors 82 so as to retain upwardly extending tabs 58 in place. The sun visors thus engage vertically extending heavily reinforced panels 54 which are sufficiently strong to hold sunshade 50 in place, and which are significantly stronger than the weakly reinforced panels 52. The heavily reinforced panels 54 are preferably at least three times as stiff as the other panels 52 including the panels immediately adjacent to the reinforced and sun-visor-engaging panels 54.

Figure 8:
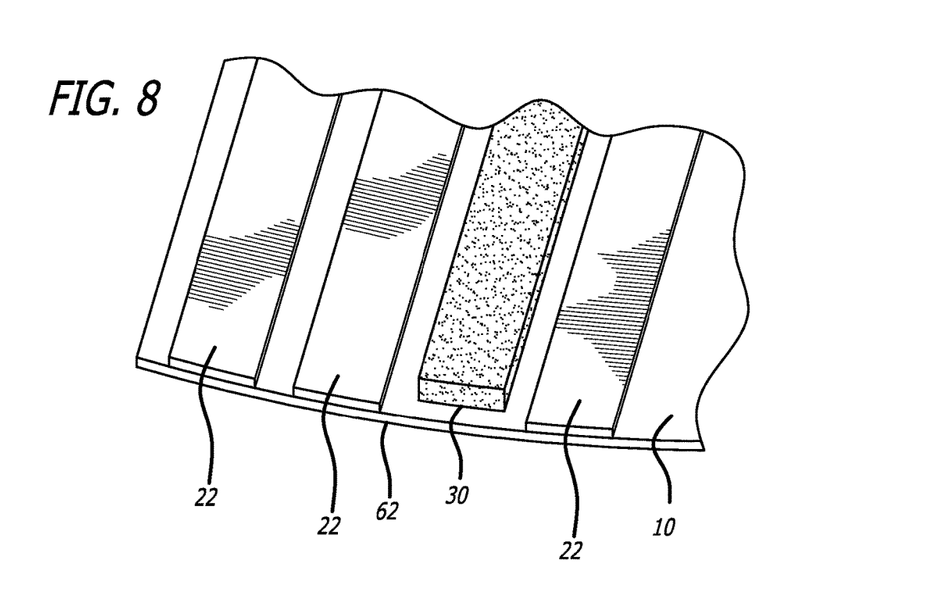
FIG. 8 is a top perspective closeup of one corner of the sunshade of FIG. 3 but with the top cover and edging removed for clarity of illustration.

FIG. 8 is a top perspective closeup of one corner of the sunshade of FIG. 3 but with the top cover 12 and edging 56 removed for clarity of illustration. Cardboard strips 22 can extend all the way to the bottom edge 62 and the top edge 64 (FIG. 3) of sunshade 50. In contrast, foamboard panels 30 do not extend all the way to the top and bottom edges 62, 64 of sunshade 50. In the exemplary embodiment, foamboard panels 30 extend to within approximately 1 to 1½ inches of the periphery but do not extend to the periphery.

Figure 9:
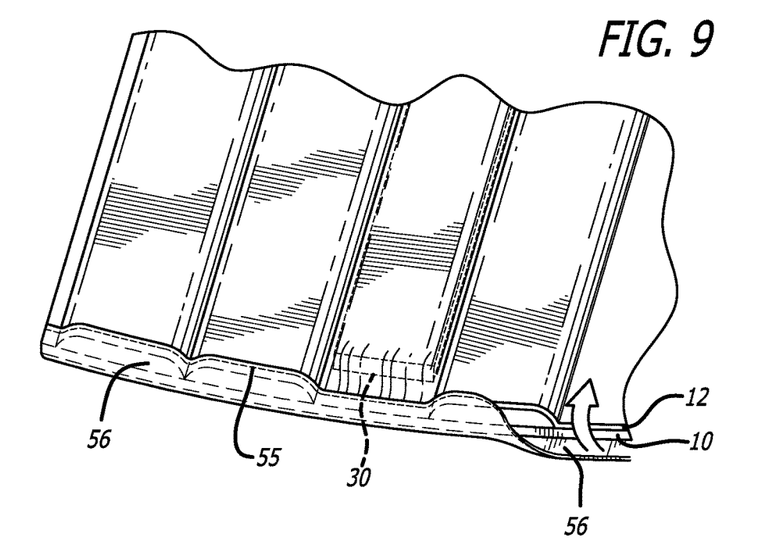
FIG. 9 is a top perspective view of the sunshade of FIG. 8 showing edging being applied and stitched thereto.

FIG. 9 is a top perspective view of the sunshade 50 of FIG. 8 showing edging 56 being applied and stitched thereto. The stitching 55 penetrates the top and bottom sheets 10, 12, and penetrates the edging material 56 and the cardboard stiffening strips 22 but does not penetrate the foamboard stiffener panels 30 because those stiffener panels do not reach the sunshade's edge.

Figure 10:
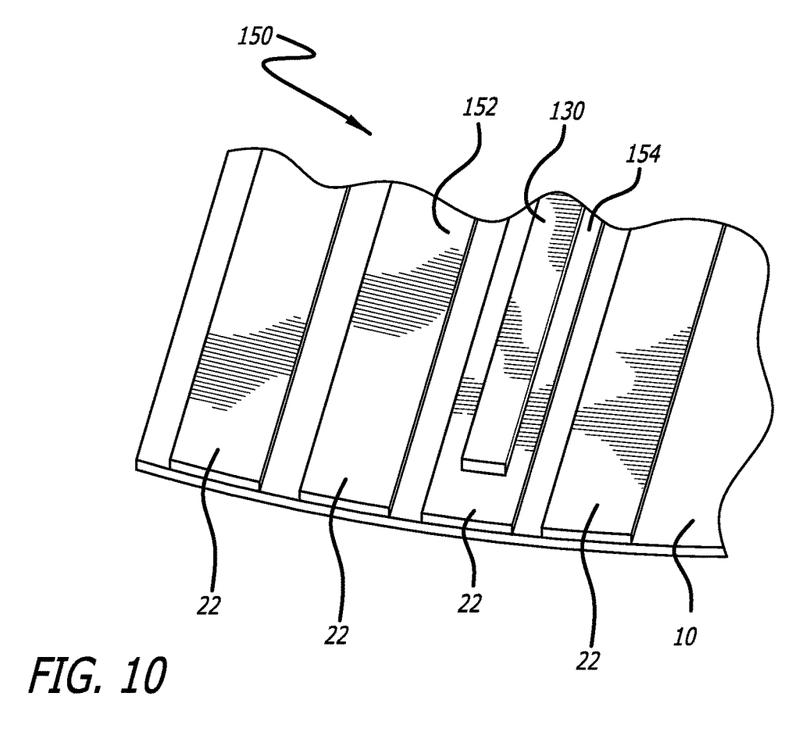
FIG. 10 is a top perspective closeup of one corner of a sunshade of a second embodiment with the top cover and edging removed for clarity of illustration.

FIG. 10 illustrates a second embodiment. FIG. 10 is a top perspective closeup of one corner of a sunshade 150 having reinforced panels with the top cover 12 and edging 56 removed for clarity of illustration, similar to the view of FIG. 8. In this embodiment instead of a foamboard panel 30 used as the stiffener panel, the reinforced panel 154 includes a strip of spring material 130 such as spring metal, and more particularly, spring steel, affixed to a carrier substrate. The spring material could be any material with springy resilience, preferably that bends significantly without breaking, including various types of plastic. The carrier substrate could be a cardboard strip 22 similar to the other stiffening strips 22 in the sunshade. The spring metal 130 is thus the stiffener panel. The spring metal is preferably affixed to the strip by adhesive such as a spray adhesive or a hot melt adhesive, but could be affixed by other means including but not limited to riveting. As with the first embodiment, the sunshade 150 could include two such reinforced panels 154, each of which engages a sun visor, with weaker panels 152 therebetween that are thinner, lighter, not as stiff, and less expensive. The reinforced panels 154 engaging the sun visors are sufficient to hold up sunshade 150 including weaker panels 152 in the sunshade's proper position underneath the windshield of an automobile even after repeated use including repeated folding and unfolding, and repeated prolonged exposure to the sun. As with the foamboard panels 30 of the prior embodiment, the strips of spring steel 130 do not extend all the way to the top and bottom edges of the sunshade, and the edging material 56 does not cover the spring steel 130 and the edging stitching 55 does not penetrate the spring steel. In an exemplary embodiment, the strips of spring steel 130 extend to within three inches of the top and bottom edges of the sunshade, and preferably to within about 1 to 1½ inches of the top and bottom edges, but do not extend all the way to the top and bottom edges of the sunshade. More generally, strips 130 could be of any material that is significantly stiffer than the material of which the weaker panels are made. The strips of spring steel 130 can be fed into a laminating section at the same time as the cardboard strips 22 as in FIG. 1, or could be affixed to the sunshade blank 32 after lamination and cutting.

It is not strictly necessary that the stiffening panels, which can be either foamboard panels 30 or spring metal strings 130 or other stiffening material, extend all the way up to engage the sun visors. Rather, the stiffening panels could extend close to the sun visors but not all the way thereto. In that case the stiffening panels still provide enough support to keep the sunshade from dropping or sagging even after much use, with the upwardly extending tabs 58 being flexible enough to allow the user to bend those tabs for slightly easier installation into position underneath the windshield of an automobile.

It is also not strictly necessary that the sunshade include either upwardly extending tabs 58 or rear view mirror cutout 59. In another possible embodiment the sunshade does not have either one or both of those features. The sunshade could therefore be a folding square panel or nearly square panel that extends high enough to engage the sun visors and/or the rear view mirror. However, tabs 58 and rear view mirror cutout 59 add to the easy of placing sunshade 50 into the windshield of an automobile and later removing it.

Furthermore, it is not strictly necessary that the materials be affixed together via a method that would traditionally be considered a lamination process. The materials could be affixed together by rivets, spot heat welding, staples, stitching, or other methods.

It is also not strictly necessary that the sunshade include cardboard strips 22. The material that will form the top and bottom covers 10, 12 could be sufficiently strong for panels 52 as those materials are sourced, and fold lines could be stamped, routed, laser ablated, or otherwise formed into that material to define a number of panels with fold lines between those panels. In such an embodiment, the major components of the sunshade would be top and bottom covers that themselves define a number of panels foldably connected together, with selected ones of those panels being reinforced by the addition of stiffener material therebetween.

It will be understood that the terms "generally," "approximately," "about," "substantially," "parallel," and "coplanar" as used within the specification and the claims herein allow for a certain amount of variation from any exact dimensions, measurements, and arrangements, and that those terms should be understood within the context of the description and operation of the invention as disclosed herein.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

I claim:

1. A folding automobile sunshade comprising:
   a bottom sheet of flexible material, the bottom sheet having a top edge and a bottom edge opposite the top edge, the top and bottom edges of the flexible sheet defining top and bottom edges of the folding automobile sunshade;
   a plurality of stiffening strips arranged on the bottom sheet and extending in a direction from the bottom edge to the top edge, the stiffening strips being sufficiently flexible that they are capable of being rolled up onto a roll of stiffening strip material;
   at least one stiffener panel, the stiffener panel being sufficiently stiff that it is incapable of being rolled up into a roll of stiffener panel material, the stiffener panel extending generally in parallel with the stiffening strips; and
   a top sheet of flexible material over the bottom sheet, the stiffening strips, and the stiffener panel, and affixed to the stiffening strips;
   wherein:
   the folding automobile sunshade folds into a stack of sunshade panels of differing stiffnesses, the stack of sunshade panels of different stiffnesses including:
      a plurality of sunshade panels comprising stiffening strips but having no stiffener panel; and
      at least one sunshade panel comprising said at least one stiffener panel, wherein the stiffener panel is stiffer than the stiffening strips.

2. The folding automobile sunshade of claim 1 wherein: the at least one stiffener panel comprises spring metal.

3. The folding automobile sunshade of claim 1 wherein: the at least one stiffener panel comprises at least two stiffener panels spaced apart from one another; and
   at least two of said stiffening strips are disposed between the two stiffener panels;
   whereby the folding automobile sunshade includes at least first and second sunshade panels that are stiffer than at least third and fourth sunshade panel disposed therebetween.

4. The folding automobile sunshade of claim 3 wherein at the top edge of the sunshade, the stiffer first and second panels extend beyond an uppermost extent of at least some of the stiffening strips, the uppermost portions of the stiffer first and second panels defining upwardly projecting reinforced tabs, the upwardly projecting reinforced tabs being stiffer than the third and fourth sunshade panels.

5. The folding automobile sunshade of claim 4 wherein: the upwardly projecting reinforced tabs are positioned and sized to engage respective driver side and passenger side pivoting sun visors of an automobile such that the stiffer first and second sunshade panels engage the driver side and passenger side pivoting sun visors, with the third and fourth sunshade panels disposed between the stiffer first and second sunshade panels that engage the sun visors.

6. The folding automobile sunshade of claim 5 wherein: the stiffener panels do not extend all the way to respectively adjacent top and bottom edges of the sunshade; and
   wherein the sunshade further comprises edging strip that extends around an outer periphery of the sunshade, and extends over respective ends of the stiffening strips but does not extend over ends of the stiffener panels.

7. The folding automobile sunshade of claim 3 wherein: the sunshade has a cutout along a top portion thereof, the cutout being formed within at least one of the third and fourth sunshade panels and being smaller in at least one dimension than a rear view mirror of an automobile for which the sunshade is intended for use; and said at least one third and fourth sunshade panel being sufficiently flexible to allow those areas to bend while the cutout and said immediately adjacent areas are passed over said rear view mirror, whereby the sunshade can be easily installed underneath a windshield of an automobile in which the rear view mirror is larger than the cutout.

8. The folding automobile sunshade of claim 3 wherein the first and second panels are at least three times as stiff as the third and fourth panels disposed therebetween.

9. The folding automobile sunshade of claim 1 wherein:
first and second ones of the stiffener panels engage a passenger-side sun visor and a driver-side sun visor, respectively, of an automobile when the sunshade is placed underneath a windshield of the automobile and said sun visors are rotated into respectively downward positions.

10. The folding automobile sunshade of claim 9 wherein said first and second ones of the stiffener panels are sufficiently strong to hold up the sunshade under the windshield.

11. The folding automobile sunshade of claim 1 wherein:
the sunshade has a cutout along a top portion thereof, the cutout being smaller in at least one dimension than a rear view mirror of an automobile for which the sunshade is intended for use; and
areas of the sunshade immediately adjacent the cutout are sufficiently flexible to allow those areas to bend while the cutout and said immediately adjacent areas are passed over said rear view mirror, whereby the sunshade can be easily installed in an automobile in which the rear view mirror is larger than the cutout.

12. The folding automobile sunshade of claim 1 wherein the sunshade has a periphery thereof, and the stiffener panels extend to within three inches of the periphery but do not extend to the periphery.

13. The folding automobile sunshade of claim 12 further comprising edging material stitched to the periphery by stitching, the stitching penetrating the stiffening strips but not penetrating the stiffener panels.

14. The folding automobile sunshade of claim 1 wherein the stiffener strips comprise a fiber material and the stiffener panels comprise a foam material.

15. The folding automobile sunshade of claim 14 wherein the fiber material comprises non-corrugated cardboard.

16. The folding automobile sunshade of claim 1 wherein during manufacturing of the automobile sunshade:
the stiffener strips were rolled out from a continuous roll; and
the stiffener panels were not rolled out from a continuous roll.

17. The folding automobile sunshade of claim 1 wherein when said sunshade is deployed in the windshield of an automobile, the sunshade includes:
a first sunshade panel that extends upwardly to engage a passenger side sun visor of the automobile when said passenger side sun visor is in its downward position;
a second sunshade panel that extends upwardly to engage a driver side sun visor of the automobile when said driver side sun visor is in its downward position;
a third sunshade panel laterally outward of the first sunshade panel and hinged thereto;
a fourth sunshade panel laterally outward of the second sunshade panel and hinged thereto; and
a fifth sunshade panel between the first and second sunshade panels; and
wherein the first and second sunshade panels are stiffer than the third, fourth, and fifth sunshade panels.

18. The folding sunshade of claim 17 wherein the stiffer first and second sunshade panels are longer than the third, fourth, and fifth sunshade panels.

19. The folding sunshade of claim 1 wherein said sunshade panels of differing stiffnesses all have equal widths.

* * * * *

UNITED STATES PATENT AND TRADEMARK OFFICE
CERTIFICATE OF CORRECTION

PATENT NO. : 9,643,476 B2
APPLICATION NO. : 14/636038
DATED : May 9, 2017
INVENTOR(S) : Henri Lenterman It is certified that error appears in the above-identified patent and that said Letters Patent is hereby corrected as shown below:

In the Claims

In Claim 3, Column 8, Line 36, delete "panel" and insert --panels--.

In Claim 7, Column 9, Line 1, after "one" insert --of the--.

In Claim 7, Column 9, Line 1, delete "panel" and insert --panels--.

In Claim 17, Column 10, Line 28, after "sunshade panels;" delete "and".

In Claim 18, Column 10, Line 31, after "The folding" insert --automobile--.

In Claim 19, Column 10, Line 34, alter "The folding" insert --automobile--.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*